Figure 1:
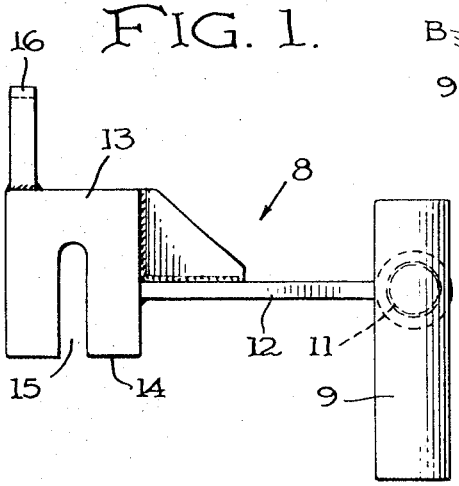
Figure 2:
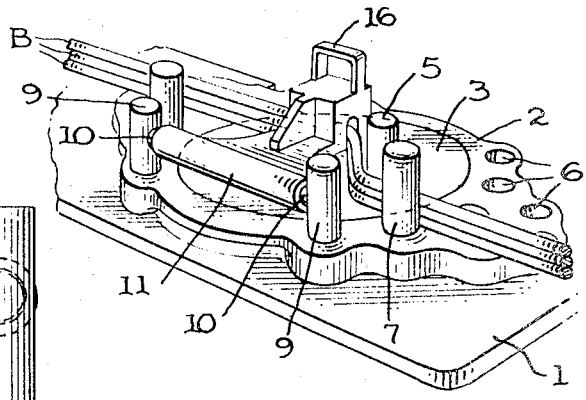
Figure 3:
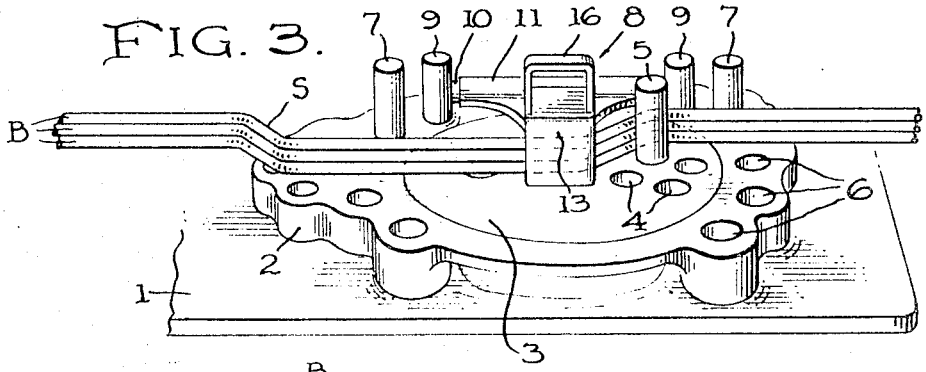
Figure 4:
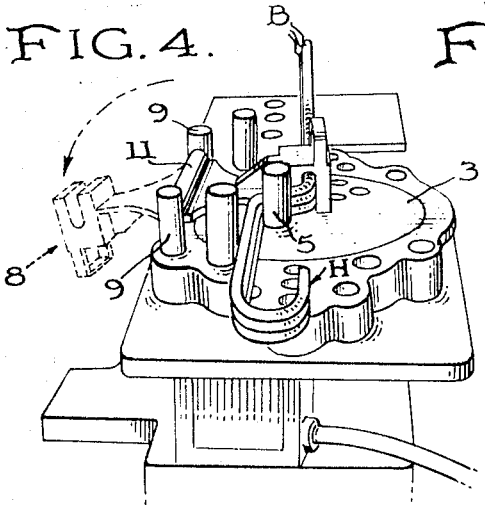
Figure 5:
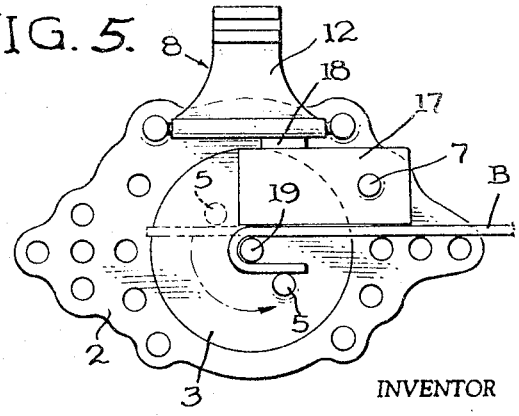

T863011

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JUNE 24, 1969

863 O.G. 1001

792,223

ROTARY HEAD BAR BENDER

Garland W. Palmer, Grand Island, N.Y., assignor to Republic Steel Corporation, Cleveland, Ohio, a corporation of New Jersey

Filed Jan. 14, 1969. Published June 24, 1969

Int. Cl. B21d *7/24*

U.S. Cl. 72—219

1 Sheet Drawing. 10 Pages Specification

A bending head is adapted for rotatable movement within an opening in a stationary back-up table, both the head and table having openings for the reception of bending and back-up pins, respectively. Left or right hand hooks are formed in metal bars by the selective placement of the bending and back-up pins prior to rotation of the

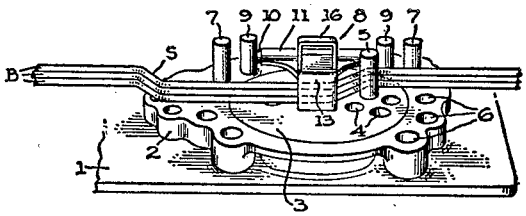

bending head in a clockwise or counterclockwise direction to deform the bars. Left or right hand slant bends are formed in the bars without the necessity of turning the bars, by means of a pivotal truss bend assembly having a bar block which is lowered over the bending head and stabilizes the bars while the head is rotated and the pins deform the bars.

June 24, 1969 G. W. PALMER DEF. PUB. T863011

ROTARY HEAD BAR BENDER

SN - 792223

Filed Jan. 14, 1969

INVENTOR

GARLAND W. PALMER

BY Emory G. Groff Jr.

ATTORNEY